(12) United States Patent
Bachinger et al.

(10) Patent No.: US 6,432,871 B1
(45) Date of Patent: Aug. 13, 2002

(54) PROCESS FOR MANUFACTURING A CATALYST BODY FOR GENERATING HYDROGEN AND A CATALYST BODY FOR GENERATING HYDROGEN

(75) Inventors: Patrick Bachinger, Lenningen; Berthold Keppeler, Kirchheim/Teck; Oskar Lamla, Bssingen a.d. Teck; Bernd Schoenrock, Owen/Teck; Martin Schuessler, Ulm; Dagmar Waidelich, Winnenden-Hanweiler, all of (DE)

(73) Assignee: XCELLSIS GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/421,352

(22) Filed: Oct. 18, 1999

(30) Foreign Application Priority Data

Oct. 17, 1998 (DE) ......................... 198 47 987

(51) Int. Cl.[7] ............................. B01J 23/70; C01G 3/00; C01G 3/02; B01D 11/00
(52) U.S. Cl. ..................... 502/345; 502/346; 264/48; 264/46.4; 264/414; 423/23; 423/27; 423/604; 423/658.5
(58) Field of Search ................ 502/318, 331, 502/345, 346, 439; 423/23, 27, 604, 658.5; 75/638, 641; 264/414, 48, 46.4, 259

(56) References Cited

U.S. PATENT DOCUMENTS

| | | | | |
|---|---|---|---|---|
| 3,069,759 A | * | 12/1962 | Grant et al. ............... | 29/182.5 |
| 3,143,789 A | * | 8/1964 | Iler et al. .................. | 29/182.5 |
| 3,158,473 A | * | 11/1964 | Gatti ........................... | 75/206 |
| 3,180,727 A | * | 4/1965 | Alexander et al. ........... | 75/134 |
| 3,492,113 A | * | 1/1970 | Shafer et al. ................ | 75/0.5 |
| 3,668,149 A | * | 6/1972 | Geus et al. .................. | 252/448 |
| 3,779,714 A | * | 12/1973 | Nadkarni et al. .......... | 29/182.5 |
| 3,894,963 A | * | 7/1975 | Gerdes et al. .............. | 252/464 |
| 3,900,429 A | * | 8/1975 | Komatsu et al. ............. | 252/462 |
| 4,002,578 A | | 1/1977 | Csicsery .................. | 252/455 Z |
| 4,003,976 A | * | 1/1977 | Komatsu et al. .......... | 423/213.5 |
| 4,031,291 A | * | 6/1977 | Fullenwider .................. | 429/40 |
| 4,039,697 A | * | 8/1977 | Isawa et al. .................. | 427/27 |
| 4,171,410 A | * | 10/1979 | Frob ........................... | 521/52 |
| 4,218,387 A | * | 8/1980 | Maas et al. .................. | 556/412 |
| 5,004,498 A | * | 4/1991 | Shimamura et al. .......... | 75/233 |
| 5,068,150 A | * | 11/1991 | Nakamura et al. .......... | 428/407 |
| 5,081,083 A | | 1/1992 | Wright ........................ | 502/50 |
| 5,407,886 A | * | 4/1995 | Schneider et al. .......... | 502/244 |
| 5,837,119 A | * | 11/1998 | Kang et al. .................... | 205/74 |
| 5,958,590 A | * | 9/1999 | Kang et al. ................. | 428/403 |
| 6,066,415 A | * | 5/2000 | Sakai et al. ............. | 429/218.2 |
| 6,089,444 A | * | 7/2000 | Slattery et al. ............. | 228/194 |

FOREIGN PATENT DOCUMENTS

| | | |
|---|---|---|
| DE | 2 315 799 | 10/1973 |
| DE | 195 34 433 | 9/1995 |
| DE | 197 43 673 A1 | 4/1999 |
| EP | 0 217 532 A1 | 4/1987 |
| EP | 0 687 648 A1 | 12/1995 |
| EP | 0 906 890 | 4/1999 |
| WO | WO 96/32188 | 10/1996 |

* cited by examiner

*Primary Examiner*—Steven P. Griffin
*Assistant Examiner*—Cam N. Nguyen
(74) *Attorney, Agent, or Firm*—Crowell & Moring LLP

(57) ABSTRACT

A process for manufacturing a catalyst body for generating hydrogen having at least one thin, large-surface catalyst layer, through which the reaction mixture can be passed includes steps of pressing a copper powder (particularly dendritic copper) to form a thin and highly compressed layer which forms a formed body, sintering, the formed body in a reducing atmosphere so that a net-type carrier structure made of copper is formed, and activating a surface layer of the formed body.

11 Claims, No Drawings

PROCESS FOR MANUFACTURING A CATALYST BODY FOR GENERATING HYDROGEN AND A CATALYST BODY FOR GENERATING HYDROGEN

BACKGROUND AND SUMMARY OF THE INVENTION

This application claims the priority of German patent document 198 47 987.5, filed Oct. 17, 1998, the disclosure of which is expressly incorporated by reference herein.

The present invention relates to a system for generating hydrogen as well as to process for manufacturing such a system.

Hydrogen can be generated from hydrocarbons, from alcohol (particularly methanol), or from another form of chemically bound hydrogen. The generation of hydrogen from methanol is based on the total reaction $CH_3OH + H_2O \rightarrow CO_2 + 3H_2$. To implement this reaction, in practice a reaction mixture comprising the hydrocarbon and water vapor is guided past a suitable catalyst while heat is supplied to generate the desired hydrogen in a one-stage or multi-stage reaction. Such a system for the two-stage methanol reforming is disclosed, for example, in European Patent Document EP 0 687 648 A1. In the known system, the reaction mixture is fed to a first reactor in which only a partial conversion of the methanol is performed. After flowing through the first reactor, the gas mixture, which still contains fractions of non-converted educts, is fed to a second reactor which is optimized with respect to the residual conversion. The reactors are constructed as plate-type reactors or charging reactors, in which the catalyst is provided in bulk form, or as a coating of the distribution ducts. Furthermore, catalysts in the form of coated metal sheets, nets and foams through which the reaction mixture flows, are also known.

German patent document DE 197 43 673 A1 by the same applicant, discloses a system for generating hydrogen which comprises at least one thin, large-surface catalyst layer formed by pressing catalyst material, through which catalyst layer a reaction mixture comprising methanol and water can be pressed while the pressure is reduced. The catalyst layer used in this system has a net-type carrier structure made particularly of dendritic copper in which catalytically active constituents are held. For manufacturing such a catalyst layer, a catalyst powder, to which a metal powder of dendritic copper is admixed, is pressed and then sintered.

A catalyst disclosed in German patent document DE-OS 23 15 799 consists of a fireproof material, such as aluminum oxide, mullide, chamotte or magnesium oxide, which is impregnated with copper, copper oxide or copper nitrate or is coated with an extremely thin film of copper, copper oxide or copper nitrate on its surface or on the interior surface of its pores. In European Patent Document EP 0 217 532 A1, another catalyst of a similar construction is known, in which the catalyst material made of copper is applied to a fireproof carrier material present in a granulate form.

International Patent Document WO 96/32188 discloses a reactor system for carrying out two chemical reactions, with at least two separate reactor beds, which, however, are in a heat exchange contact and whose surfaces exposed to the reactants of the chemical reactions taking place in the reactor beds are catalytically active. The catalytically active surface of the reactor beds consists, for example, of sintered metal particles with a low particle size distribution. In this case, the material of the sintered particles is a metal or a metal alloy which itself can be catalytically active. Another possibility of further developing the known reactor consists of a plate-type reactor which is constructed on the basis of a more or less flat plate onto which a corrugated plate is welded. This arrangement is rolled up and welded together at the ends.

Based on the above, it is an object of the invention to provide an improved system for generating hydrogen in which the heat transport for the catalyzed reaction is as efficient as possible.

Furthermore, with a view to a mobile application in motor vehicles, another object of the invention is to provide a system for generating hydrogen having catalysts of a mechanical stability which is as high as possible.

Still another object of the invention is to provide a system for which the manufacturing costs and costs of the materials are as low as possible.

Finally, yet another object of the invention is to provide such a system which permits a reactivation of the catalyst when its activity decreases.

These and other objects and advantages are achieved by the process according to the invention, for manufacturing a system for generating hydrogen, which system comprises at least one thin, large-surface catalyst layer. According to the process, first a copper powder consisting particularly of dendritic copper is pressed to form a body which comprises a thin and very compressed layer. This formed body is then sintered in a reducing atmosphere so that a net-type carrier structure made of copper is created in the formed body. Following the sintering, a surface layer of the formed body is activated, forming the thin, large-surface catalyst layer.

By means of the process according to the invention, a catalyst layer is therefore produced from a copper powder which contains no additional powder fraction made of catalytically active material. This permits sintering at temperatures which are sufficiently high as to facilitate the formation of a net-type carrier structure in the formed copper body. By way of contrast, in the case of a body formed by pressing a powder mixture of copper and a catalytically active material, sintering temperatures are limited to a maximum of 600° C., because the active material is otherwise impaired.

Sintering at higher temperatures in the process according to the invention ensures a very good thermal conductivity. As a result, a clearly improved mechanical stability will also exist. Since the body formed by sintering according to the invention contains no catalytically active material other than the copper itself, a surface layer of such formed body is activated to improve its catalytic activity, thereby creating the at least one thin, large-surface catalyst layer for the system for generating hydrogen. During the activation, care should be taken that the net-type carrier structure is not impaired (at least in the core of the formed body), in order to retain the achieved mechanical stability and thermal conductivity.

In a further embodiment of the invention, the activation is performed by the repeated oxidation and reduction of the surface of the formed body. Advantageously, the process of oxidation and reduction is repeated until a surface layer of a desired thickness is activated.

In a particularly advantageous embodiment of the invention, the copper powder contains only dendritic copper, so that a particularly well constructed net-type carrier structure is achieved in the formed body after the pressing.

In another embodiment of the invention, a constituent which is not active catalytically (advantageously, aluminum)

is admixed to the copper powder, and is dissolved out of the copper network of the formed body, for activating the surface layer. As the result of this technique, the effective copper surface area of the formed body is enlarged, and the catalytic activity of the copper is increased. Such dissolution of a constituent which is not active is called a Raney process.

The system for generating hydrogen according to the invention comprises at least one thin, large-surface catalyst layer produced according to the process described above.

DETAILED DESCRIPTION OF THE INVENTION

According to the invention, a thin and highly compressed formed body is made by the pressing of a copper powder. The porosity of the formed body is determined by the contact pressure. The formed copper body obtained in this manner is sintered in a reducing atmosphere at a temperature which is sufficiently high that, as the result of the cross-linkage of the copper particles in the formed body, a net-type copper carrier structure is created. The sintering temperature advantageously amounts to more than 600° C., preferably more than 700° C.

After the sintering of the pressed formed body, it is activated in order to increase the catalytic activity of the copper body.

If a pure copper powder is used (that is, a powder which consists only of copper or dendritic copper), the activation can be performed by repeated oxidation and reduction of the formed body until a surface layer of the formed body is activated having the desired thickness. The oxidation takes place in an oxygen or air environment at an elevated temperature while reduction is performed, for example, in a hydrogen atmosphere.

If a copper powder is used to which a constituent is mixed which is catalytically not active (such as aluminum), the constituent which is not active is dissolved and extracted from the copper body, for example, by means of a solvent which does not attack the copper. In this manner, a microscopically fissured surface of the formed body is formed which enlarges the catalytically effective outer surface of the copper body.

During activation of the copper body for forming a catalyst layer which is to be used in a system for generating hydrogen, care should be taken that the core of the catalyst layer (that is, the interior area of the net-type carrier structure) is not impaired, so as to avoid reducing the thermal conductivity and the mechanical stability.

The catalyst layer produced according to the invention has a very homogeneous construction, and because of the branching closed-meshed net-type carrier structure, has a very good thermal conductivity. This is particularly advantageous with respect to heat dissipation and supply in the case of a non-autothermal catalyst reaction, and facilitates compensation of the heat balance and thus the implementation of autothermal methanol reforming.

Because of the mechanical stability improved by the net-type carrier structure, the catalyst layer is suitable for a use in mobile systems for generating hydrogen.

By stacking several catalyst layers above one another, a so-called stack reactor can be produced for generating hydrogen.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A catalyst body for generating hydrogen from hydrocarbons or alcohol, consisting of:

at least one body having a porous structure through which a reaction mixture comprising said hydrocarbon or alcohol can be passed, said body consisting of a sintered copper powder having an activated surface.

2. The catalyst body according to claim 1, wherein said copper powder consists of dendritic copper.

3. A process for manufacturing a catalyst body for generating hydrogen, comprising:

forming a thin, highly-compressed body consisting of coprer by pressing a powder consisting of copper;

sintering the compressed copper body in a reducing atmosphere, thereby producing a carrier structure; and activation at least one surface layer of the carrier structure, theerby forming a thin, large-surface layer.

4. The process according to claim 3, wherein said copper powder consists of dendritic copper.

5. The process according to claim 3, wherein said activation comprises repeated oxidation and reduction of the at least one surface of the compressed copper body.

6. The process according to claim 5, wherein the oxidation and reduction are repeated until a surface layer of a desired thickness is activated.

7. The process according to claim 3, wherein said sintering is at a temperature greater than 600° C.

8. The process according to claim 3, wherein said carrier structure has a cross-linked net structure.

9. The process according to claim 3, wherein the compressed copper body is porous.

10. A process for manufacturing a catalyst body for generating hydrogen, comprising:

pressing a powder consisting of copper and a catalytically inactive material to form a thin, highly-compressed copper body;

sintering the compressed copper body in a reducing atmosphere, thereby producing a carrier structure;

dissolving and extracting the catalytically inactive material out of the carrier structure; and activating at least one surface layer of the carrier structure, thereby forming a thin, large-surface catalyst layer.

11. The process according to claim 10, wherein the catalytically inactive material is aluminum.

* * * * *